(No Model.)
F. G. YETTER.
APPARATUS FOR PREVENTING KETTLES BOILING DRY.
No. 603,461.    Patented May 3, 1898.
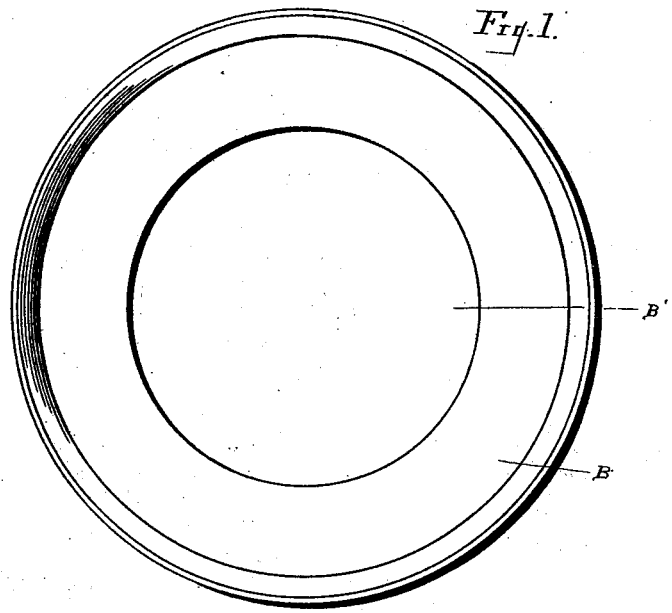
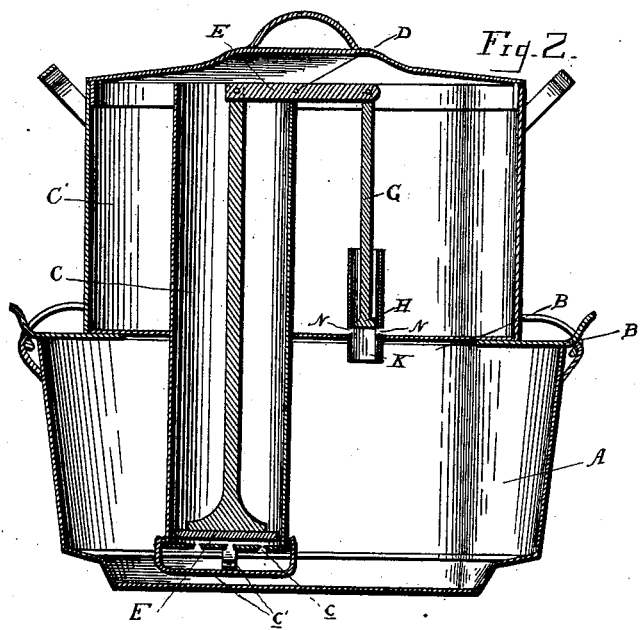

UNITED STATES PATENT OFFICE.

FREDERICK G. YETTER, OF GREENFIELD, MASSACHUSETTS.

APPARATUS FOR PREVENTING KETTLES BOILING DRY.

SPECIFICATION forming part of Letters Patent No. 603,461, dated May 3, 1898.

Application filed January 6, 1898. Serial No. 665,786. (No model.)

*To all whom it may concern:*

Be it known that I, FREDERICK G. YETTER, a citizen of the United States, residing at Greenfield, in the county of Franklin and State of Massachusetts, have invented certain new and useful Improvements in Apparatus for Preventing Kettles Boiling Dry; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in culinary articles, and especially to an apparatus for automatically feeding water from a tank into a domestic steamer or kettle to prevent the same from boiling dry, the water being supplied to the kettle through the means of a float.

A further part of the invention resides in the provision of an apparatus of this character whereby water may be automatically fed into a kettle to prevent the same boiling dry, and which apparatus is so constructed as to be adapted for use on various-sized kettles or steamers, as will appear when the invention is considered in connection with the following description, taken in connection with the accompanying drawings.

To these ends and to such others as the invention may pertain the same consists, further, in the novel construction, combination, and adaptation of the parts, as will be hereinafter more fully described and then specifically defined in the appended claim.

The invention is clearly illustrated in the accompanying drawings, in which—

Figure 1 is a perspective view of the apparatus shown as applied to a kettle or steamer. Fig. 2 is a central vertical sectional view through the steamer and the automatically-operated feeder.

Reference now being had to the details of the drawings by letter, A designates the steamer or kettle, and B a cover for the same, which is provided with a large aperture B', through which the well or extended portion C of the water-tank C' is adapted to pass. The said tank C' rests on the surface of the said cover, and when it is desired to adapt the tank for application to different-sized kettles or steamers a different-sized cover may be employed, which cover should fit the particular kettle or steamer on which the tank is to be used. The lower end of the well or extension C is perforated, as at c, and straps c' are provided to prevent the lower end of the well or extension coming in contact with the bottom of the kettle or steamer. The said well is extended up through the tank, preferably to a location near its top, and has pivoted to its upper free edge a lever D, to one end of which lever is pivoted the stem E of the float F, which is located in the well, the other end of the said lever being connected pivotally to the valve-stem G, which has a valve H at its lower end working in the tubing K, which latter is fastened to the bottom of the water-tank, with its lower end extended through the bottom a slight distance. Apertures N in the said tubing, near the bottom of the tank, allow water to pass from the tank into the tubing, thence through and out at its lower end, from whence the water is allowed to drop into the kettle or steamer beneath when the valve H is raised to a location above the apertures N.

In operation we will have, preferably, about two inches of water in the kettle or steamer at all times and the water-tank filled, which is allowed to escape and drip into the kettle through the tubing as the float in the well lowers sufficiently to draw up the valve in the tubing to a position above or partially above the apertures N therein, so as to allow the water to pass from the tank into the kettle or steamer beneath. When a sufficient quantity of water has passed into the kettle, the float will rise on the surface of the water and the valve will close the aperture in the tube and the supply of water will be cut off.

Having thus described my invention, what I claim to be new, and desire to secure by Letters Patent, is—

In an apparatus for preventing kettles or steamers boiling dry, consisting of the tank described provided with the well and tubing extending through its bottom and the float, combined with the cover having an enlarged aperture therein on which cover the tank is designed to rest, and through which aperture the said tubing and well pass, the tubing and the valve mounted therein, the lever pivoted to the upper end of the extension of the wall, and connections between the same and the valve and float, as shown and for the purpose set forth.

In testimony whereof I affix my signature in presence of two witnesses.

FREDERICK G. YETTER.

Witnesses:
BURT H. WINN,
LYMAN W. GRISWOLD.